US008488455B2

(12) United States Patent
Koskinen

(10) Patent No.: US 8,488,455 B2
(45) Date of Patent: Jul. 16, 2013

(54) METHOD AND APPARATUS FOR FAIR SCHEDULING OF BROADCAST SERVICES

(75) Inventor: Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 345 days.

(21) Appl. No.: 12/819,768

(22) Filed: Jun. 21, 2010

(65) Prior Publication Data

US 2011/0310783 A1 Dec. 22, 2011

(51) Int. Cl.
*H04L 12/26* (2006.01)
*H04L 12/28* (2006.01)

(52) U.S. Cl.
USPC .................. 370/230; 370/235; 370/395.21

(58) Field of Classification Search
None
See application file for complete search history.

(56) References Cited

U.S. PATENT DOCUMENTS

| | | | | |
|---|---|---|---|---|
| 6,456,605 | B1* | 9/2002 | Laakso et al. | 370/330 |
| 6,885,638 | B2* | 4/2005 | Xu et al. | 370/230 |
| 6,931,253 | B1* | 8/2005 | Hartikainen et al. | 455/450 |
| 7,039,013 | B2* | 5/2006 | Ruutu et al. | 370/235 |
| 7,433,946 | B2* | 10/2008 | Shen et al. | 709/223 |
| 7,599,326 | B2* | 10/2009 | Watson | 370/329 |
| 2003/0231594 | A1* | 12/2003 | Xu et al. | 370/236 |
| 2005/0172016 | A1* | 8/2005 | Kossi et al. | 709/223 |
| 2005/0222692 | A1* | 10/2005 | Karlsson et al. | 700/28 |
| 2007/0086343 | A1* | 4/2007 | Kujawa et al. | 370/235 |
| 2008/0020775 | A1* | 1/2008 | Willars | 455/445 |
| 2008/0031188 | A1* | 2/2008 | Magnusson et al. | 370/329 |
| 2008/0056125 | A1* | 3/2008 | Kneckt et al. | 370/229 |
| 2008/0307528 | A1* | 12/2008 | Chen et al. | 726/26 |
| 2009/0249421 | A1* | 10/2009 | Liu et al. | 725/116 |
| 2010/0086024 | A1* | 4/2010 | Zhang et al. | 375/240.02 |
| 2010/0195558 | A1* | 8/2010 | Koskinen | 370/312 |
| 2011/0019643 | A1* | 1/2011 | Kim et al. | 370/331 |
| 2011/0022720 | A1* | 1/2011 | Song et al. | 709/232 |
| 2011/0261695 | A1* | 10/2011 | Zhao et al. | 370/232 |
| 2011/0310783 | A1* | 12/2011 | Koskinen | 370/312 |
| 2012/0099564 | A1* | 4/2012 | Bekiares et al. | 370/336 |

OTHER PUBLICATIONS

"Uniform Packet Dropping in MBMS", R3-100232, 3GPP TSG-RAN3 Meeting #66bis, Change Request, Valencia, Spain, Jan. 18-22, 2010, 3 pages.
"QoS—Aware Method for Uniform Packet Dropping", R3-100231, 3GPP TSG-RAN WG3 Meeting #66bis, Valencia, Spain, Jan. 18-22, 2010, 6 pages.

* cited by examiner

*Primary Examiner* — Gregory Sefcheck
(74) *Attorney, Agent, or Firm* — Squire Sanders (US) LLP

(57) ABSTRACT

A method for fair scheduling of broadcasting services includes receiving, at a base station from a core network entity, data packets scheduled for transmission during a scheduling period and synchronization information for service bearers. It is determined whether there is an overflow condition based on the received synchronization information and transmission resources reserved for the plurality of service bearers for the scheduling period in a single-frequency network. Upon determining that the overflow condition is present, among the service bearers, at least one service bearer is selected based on a bearer selection function. The bearer selection function results in selecting the service bearer with a highest value or a lowest value of a ratio of two quantities each with a specific value for each service bearer. The bearer selection function does not directly compute any ratio. A data packet is then dropped from the selected at least one service bearer.

17 Claims, 3 Drawing Sheets

METHOD AND APPARATUS FOR FAIR SCHEDULING OF BROADCAST SERVICES

TECHNICAL FIELD

The present application relates generally to an apparatus and a method for fair scheduling of broadcast services.

BACKGROUND

The broadcast service data transmission may be carried out as multicast/broadcast single-frequency network (MBSFN) transmission where multiple base stations participate in time-frequency synchronized transmission of broadcast service data. The radio resource reservation may be made jointly by the participating base station for different services to improve efficiency. The reservation of radio resources such as sub-frames may be made for a multicast channel (MCH) in the form of a periodical pattern. Within each period of such periodical pattern, also termed MCH scheduling period, different services may be scheduled, so that the multiplexed services may be scheduled in a predefined order so that the data for the first service precedes the data for the second service and so on.

The broadcast service data may be multiplexed on a multicast channel to achieve statistical-multiplexing gains. One potential consequence of the statistical multiplexing of broadcast service data is possible overflow where all the data for the multiplexed services may not be accommodated by the reserved radio resources for a given scheduling period. In such an overflow situation, the content-synchronization requirement of the MBSFN transmission require that all participating base stations use the exactly same rule for selecting same data packets to drop and transmit exactly same data packets.

SUMMARY

Various aspects of the invention are set out in the claims.

In accordance with an example embodiment of the present invention, a method comprises a) receiving at a network node from a core network entity a plurality of data packets scheduled for transmission during a scheduling period and synchronization information for a plurality of service bearers; b) determining whether there is an overflow condition based on the received synchronization information and transmission resources reserved for the plurality of service bearers for the scheduling period in a single-frequency network; c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and d) dropping a data packet from the selected at least one service bearer.

In accordance with an example embodiment of the present invention, an apparatus comprises at least one processor; and at least one memory including computer program code. The at least one memory and the computer program code are configured to, with the at least one processor, cause the apparatus to perform at least the following: a) receiving from a core network entity a plurality of data packets scheduled for transmission during a scheduling period, and synchronization information for a plurality of service bearers; b) determining whether there is an overflow condition based on the received synchronization information and transmission resources reserved for the plurality of service bearers for the scheduling period in a single-frequency network; c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and d) dropping a data packet from the selected at least one service bearer.

In accordance with another example embodiment of the present invention, a system comprises a plurality of base stations, each of the base stations comprising at least one processor; and at least one memory including computer program code. The at least one memory and the computer program code are configured to, with the at least one processor, cause the base station to perform at least the following: a) receiving from a core network entity a plurality of data packets scheduled for transmission during a scheduling period, and synchronization information for a plurality of service bearers; b) determining whether there is an overflow condition based on the received synchronization information and transmission resources reserved for the plurality of service bearers for the scheduling period in a single-frequency network; c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and d) dropping a data packet from the selected at least one service bearer.

BRIEF DESCRIPTION OF DRAWINGS

For a more complete understanding of example embodiments of the present invention, reference is now made to the following descriptions taken in connection with the accompanying drawings in which.

DETAILED DESCRIPTION

A selection function is disclosed herein that ensures that synchronized base stations select the same broadcast service bearer and same packet to drop in correcting an overflow condition. The selection function is configured to find the broadcast service bearer that has a highest or lowest value of a ratio among all the broadcast service bearers for the scheduling period, without computing the ratio. The selection function is obtained via multiplying the ratio $x(i)/y(i)$ where i denotes the bearer, with a positive constant C common to all the broadcast service bearers, resulting in the expression $x(i)/y(i)*C$. In one example embodiment, C may be chosen as the product of all individual $y(i)$ of all the broadcast service bearers, such that $C=y(1)*y(2)* \ldots *y(n)$.

Figure 1:
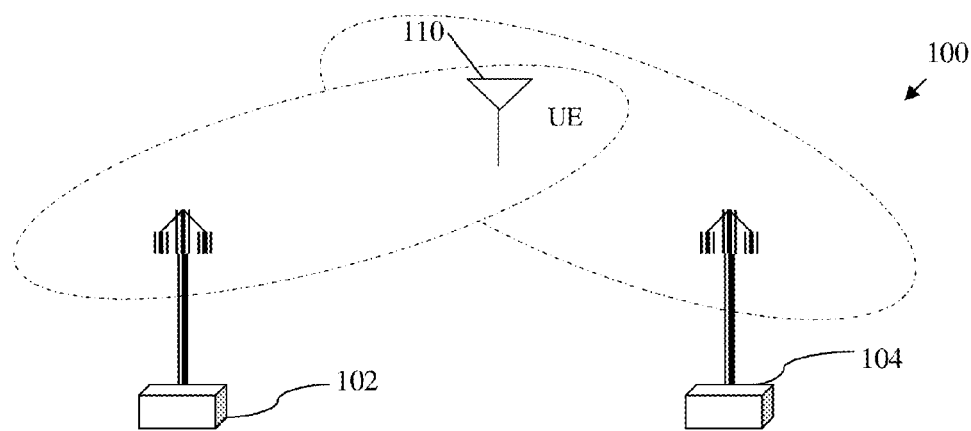
FIG. 1 illustrates an example wireless system 100 that supports synchronized data packet dropping in accordance with an example embodiment of the invention.
Figure 2:
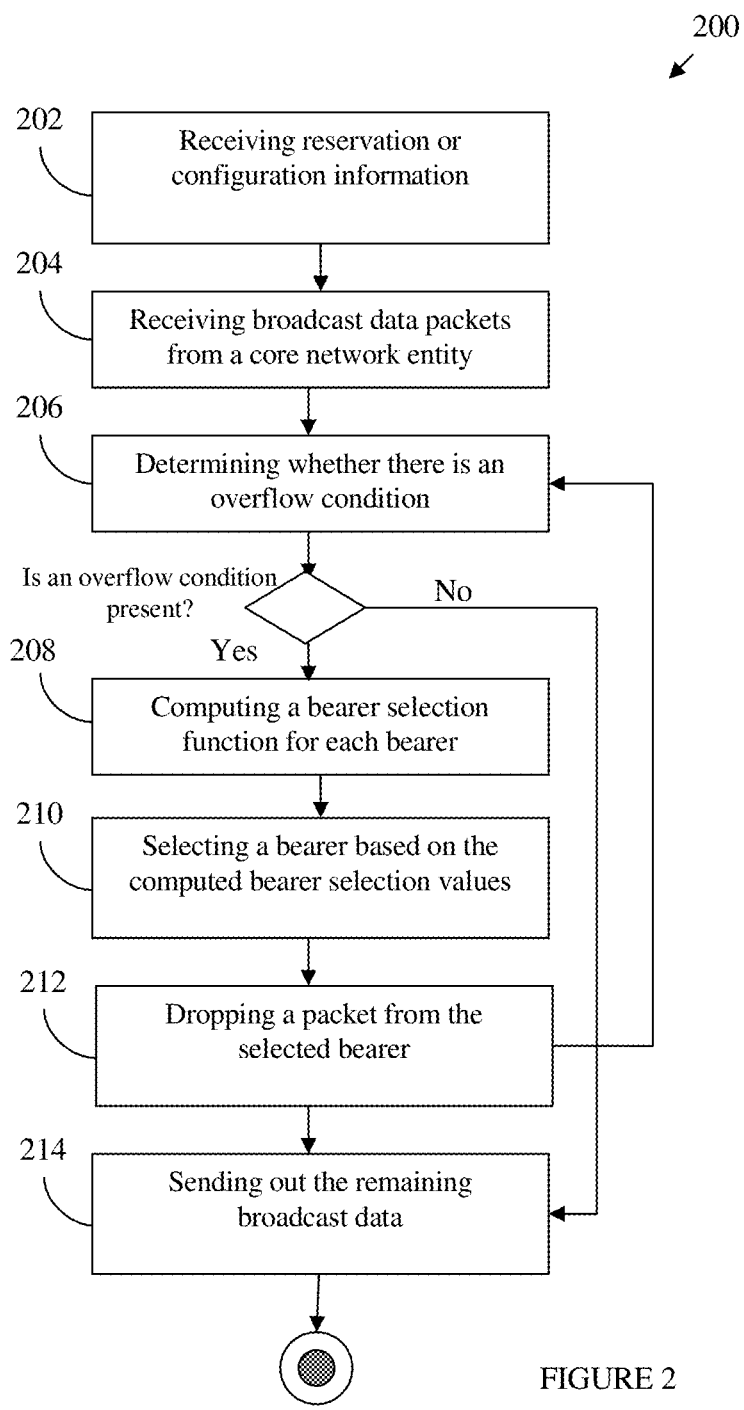
FIG. 2 illustrates an example method 200 for synchronized data packet dropping in accordance with an example embodiment of the invention.
Figure 3:
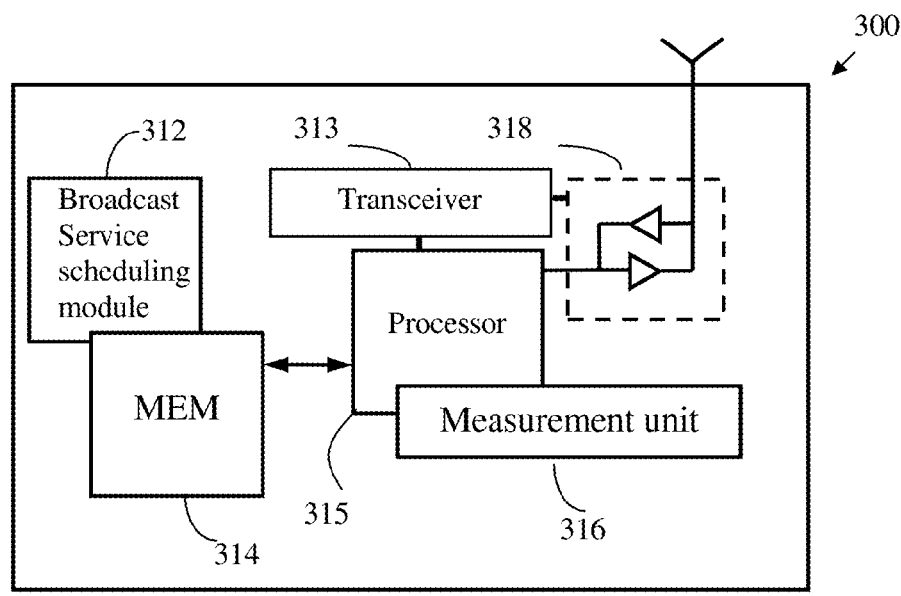
FIG. 3 illustrates an example wireless apparatus in accordance with an example embodiment of the invention.

An example embodiment of the present invention and its potential advantages are best understood by referring to FIGS. 1 through 3 of the drawings, like numerals being used for like and corresponding parts of the various drawings.

FIG. 1 illustrates an example wireless system 100 that supports synchronized data packet dropping to correct an overflow condition. The wireless system 100 includes a UE 110 and a first base station 102 and a second base station 104. An example embodiment of the base stations 102 and 104 may be a long term evolution (LTE) Node B (eNB). The base stations 102 and 104 both are configured to transmit synchronized broadcast service data to the mobile stations such as UE 110 to support multicast multimedia service such as mobile TV service. The UE 110 is within the transmission ranges of both the base stations 102 and 104.

In one example embodiment, a core network entity such as a gateway controller or a media gateway may send to both base stations 102 and 104 service data for multiple Multicast Broadcast Multimedia Service (MBMS) bearers to be broadcast in a multicast-broadcast single-frequency network (MBSFN) context, together with required synchronization information, over a protocol such as the 3rd Generation Partnership Project (3GPP) synchronization (SYNC) protocol.

The synchronization signaling information from the core network entity may include transmission timing and a scheduling period for data transmission. For each scheduling period, the offered data packets originating from the core network entity may be sent from the base stations 102 and 104 to the UE 110. It may happen that the amount of the broadcast data exceeds the reserved radio resources. In such an overflow situation, the base stations 102 and 104 need to drop the same packets from the same broadcast service bearers. The base stations 102 and 104 are configured to avoid potentially selecting different broadcast service bearers due to different floating-point operations resulting in different rounding results in computing a ratio used in selecting the broadcast service bearers. The base stations 102 and 104 use an identical bearer selection function that represents a ratio of the received amount of data to the amount guaranteed by the guaranteed bit rate for the scheduling period, for each broadcast service bearer. This bearer selection method ensures that the two base stations select an identical bearer and drop the same packet from the selected bearer. This process may be repeated until the overflow condition is corrected.

FIG. 2 illustrates an example method 200 for synchronized data packet dropping to correct an overflow condition. The method 200 includes receiving resource reservation or configuration information at block 202, receiving data packets at block 204, and determining whether there is an overflow condition present at block 206. If an overflow condition is not present, the method 200 proceeds to sending the received broadcast data packet at block 214 and terminates. Otherwise, the method 200 may include computing a bearer selection function for each broadcast service bearer at block 208, selecting at least one broadcast service bearer based on the computed bearer selection function at block 210 and dropping a packet from the selected broadcast service bearer at block 212. If the overflow condition has been corrected, the method 200 proceeds to sending out the remaining broadcast data packets at block 214. Otherwise, the method 200 loops back and repeats the process until the overflow condition is corrected.

In one example embodiment, receiving reservation or configuration information at block 202 may include receiving radio resource reservation or other configuration data from a radio-access network entity prior to a data session for transmission of broadcast service data. The reserved resource may include physical resources such as radio or transmission resources or logical resources such as broadcast service bearers, or both. In one example embodiment, receiving the broadcast data packets at block 204 may include receiving from a core network entity the data packets from the broadcast service bearers that are statistically multiplexed on a broadcast channel. The same data streams are received by multiple base stations and are to be sent to the associated UE in a time-frequency synchronized manner. Receiving the broadcast data packets at block 204 may also include receiving synchronization information that are included in the packet header of the received packets such as the 3GPP SYNC protocol packets. The synchronization information in turn may include information such as a scheduling period and transmission timing.

In one example embodiment, determining whether there is an overflow condition present at block 206 may include determining that the overflow condition is present, if the amount of data for the scheduling period as indicated in the synchronization information is greater than that accommodated by the reserved radio resources. Optionally, determining whether there is an overflow condition present at block 206 may also include determining the extent of the overflow condition and thus an amount of corrective action that may be needed.

In one example embodiment, computing a bearer selection function for each broadcast service bearer at block 208 may include selecting a bearer that has the highest or lowest value of a ratio among all the broadcast service bearers for the scheduling period. The bearer selection function is obtained by multiplying the ratio $x(i)/y(i)$ with a positive constant C, resulting in the expression $x(i)/y(i)*C$, where C is common to all the broadcast service bearers. In one example embodiment, x and y may be some quantities that both depend on the total n broadcast service bearers, such as the offered data for the ith broadcast service bearer, and the guaranteed bit rate (GBR) of the ith broadcast service bearer. The ith broadcast service bearer that has the highest value of $x(i)/y(i)$ among all the broadcast service bearers for the scheduling period, also has the highest value of $x(i)/y(i)*C$. In one example embodiment, the common constant C may be chosen as the product of all individual $y(i)$ of all the broadcast service bearers, such that $C=y(1)*y(2)* \ldots *y(n)$. C, dependent on all the bearers, is common to all the broadcast service bearers. Thus, the bearer selection function may be based on the modified ratio $x(i)/y(i)*C$ and expressed as the product $x(i)*y(1)* \ldots *y(i-1)*y(i+1)*y(n)$. Thus the bearer that has the highest value or the lowest value of $x(i)/y(i)$ is also the bearer that has the highest value or lowest value of $x(i)*y(1)* \ldots *y(i-1)*y(i+1)*y(n)$. Also in one example embodiment, the bearer selection function results in selecting the service bearer with a highest value or a lowest value of a ratio of two quantities each with a specific value for each of the plurality of service bearers while the bearer selection function does not directly compute any ratio.

In one example embodiment, computing a bearer selection function for each reserved bearer at block 208 upon determining that the overflow condition is present may involve computing a bearer selection value Pi for each ith multiplexed broadcast service bearer for the scheduling period. Specifically, Pi is defined as $Pi=D_i \times \Pi_{j \neq i} GBR_j$, where $D_i$ is an amount of data assigned to the ith broadcast service bearer for the scheduling period, and $\Pi_{j \neq i} GBR_j$ is a product of guaranteed bit rates (GBR) of all the broadcast service bearers multiplexed on a multicast channel except for the ith guaranteed bit rate for the ith broadcast service bearer.

In one example embodiment, selecting the broadcast service bearer at block 210 may include selecting at least one broadcast service bearer with a highest bearer selection function value. In one example embodiment, selecting the broadcast service bearer at block 210 comprises selecting a broadcast service bearer with a highest ratio of data assigned to the broadcast service bearer to an amount of data guaranteed for the broadcast service bearer by its guaranteed bit rate for the scheduling period. Selecting a broadcast service bearer at block 210 may also include breaking a tie between two selected broadcast service bearers by sequentially trying following criteria until the tie is broken: a largest packet loss rate, a lowest priority and a lowest temporary mobile group identifier (TMGI).

In one example embodiment, dropping a packet from the selected broadcast service bearer at block 212 may include dropping the packet with a highest sequence number from the selected broadcast service bearer. In one example embodiment, sending out the received broadcast data packets at block 214 may include sending the broadcast data packets by the multiple base stations to the UEs in a time-frequency synchronized manner after the overflow condition is corrected.

In one example embodiment, the method 200 may be implemented at either of the base stations 102 and 104 of FIG. 1 or by the apparatus 300 of FIG. 3. The method 200 is for illustration only and the steps of the method 200 may be combined, divided, or executed in a different order than illustrated, without departing from the scope of the invention of this example embodiment.

FIG. 3 illustrates an example wireless apparatus in accordance with an example embodiment of the invention. In FIG. 3, the wireless apparatus 300 may include a processor 315, a memory 314 coupled to the processor 315, and a suitable transceiver 313 (having a transmitter (TX) and a receiver (RX)) coupled to the processor 315, coupled to an antenna unit 318. The memory 314 may store programs such as a broadcast service scheduling module 312. The wireless apparatus 300 may be at least part of a generic 4$^{th}$ generation base station, or an LTE compatible base station.

The processor 315 or some other form of generic central processing unit (CPU) or special-purpose processor such as digital signal processor (DSP), may operate to control the various components of the wireless apparatus 300 in accordance with embedded software or firmware stored in memory 314 or stored in memory contained within the processor 315 itself. In addition to the embedded software or firmware, the processor 315 may execute other applications or application modules stored in the memory 314 or made available via wireless network communications. The application software may comprise a compiled set of machine-readable instructions that configures the processor 315 to provide the desired functionality, or the application software may be high-level software instructions to be processed by an interpreter or compiler to indirectly configure the processor 315.

In an example embodiment, the broadcast service scheduling module 312 may be configured to receive from a core network entity a plurality of data packets scheduled for transmission during a scheduling period, and synchronization information for a plurality of broadcast service bearers for the scheduling period and determine whether there is an overflow condition based on the received synchronization information and the reserved radio resources for the scheduling period in a single-frequency network. The broadcast service scheduling module 312 may also be configured to select among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio. The broadcast service scheduling module 312 may also be configured to drop a data packet from the selected at least one broadcast service bearer.

In one example embodiment, the transceiver 313 is for bidirectional wireless communications with another wireless device. The transceiver 313 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 313, portions of the antenna unit 318, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 318 may be provided to convert between wireless signals and electrical signals, enabling the wireless apparatus 300 to send and receive information from a cellular network or some other available wireless communications network or from a peer wireless device. In an embodiment, the antenna unit 318 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 318 may include antenna tuning and/or impedance matching components, RF power amplifiers, and/or low noise amplifiers.

As shown in FIG. 3, the wireless apparatus 300 may further include a measurement unit 316, which measures the signal strength level that is received from another wireless device, and compare the measurements with a configured threshold. The measurement unit may be utilized by the wireless apparatus 300 in conjunction with various exemplary embodiments of the invention, as described herein.

In general, the various exemplary embodiments of the wireless apparatus 300 may include, but are not limited to, part of a base station, an access point or a wireless device such as a portable computer having wireless communication capabilities, Internet appliances permitting wireless Internet access and browsing, as well as portable units or terminals that incorporate combinations of such functions. In one embodiment, the wireless apparatus 300 may be implemented in the base station 102 or 104 of FIG. 1.

Without in any way limiting the scope, interpretation, or application of the claims appearing below, a technical effect of one or more of the example embodiments disclosed herein is to enable a unified packet-dropping scheme for MBMS services to be applied by all the participating base stations when statistical multiplexing is employed, to guarantees the guaranteed bit rate (GBR) of each service and avoid different dropping choices because of round-off errors.

Embodiments of the present invention may be implemented in software, hardware, application logic or a combination of software, hardware and application logic. The software, application logic and/or hardware may reside on a base station, an access point or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   a) receiving at a network node from a core network entity a plurality of data packets scheduled for transmission during a scheduling period and synchronization information for a plurality of service bearers;
   b) determining whether there is an overflow condition based on the received synchronization information and transmission resources reserved for the plurality of service bearers for the scheduling period in a single-frequency network;
   c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and
   d) dropping a data packet from the selected at least one service bearer, wherein the two quantities are an amount of data assigned to the selected service bearer, and an amount of data guaranteed for the selected service bearer by its guaranteed bit rate for the scheduling period respectively, and each of the plurality of service bearers is a broadcast service bearer, and wherein the bearer selection function involves computing for each of the broadcast service bearers a bearer selection value Pi, wherein $P_i = D_i \times \Pi_{j \neq i} GBR_j$, $D_i$ is an amount of data assigned to ith broadcast service bearer for the scheduling period, and $\Pi_{j \neq i} GBR_j$ is a product of guaranteed bit rates of the plurality of broadcast service bearers multiplexed on a multicast channel except for the ith guaranteed bit rate for the ith broadcast service bearer.

2. The method of claim 1, further comprising repeating the steps b) through d) until the overflow condition is corrected.

3. The method of claim 1, wherein receiving the plurality of data packets from the core network entity comprises receiving the plurality of service data packets from a plurality of data packet streams that are statistically multiplexed on a multicast channel.

4. The method of claim 1, wherein determining whether there is the overflow condition comprises determining that the overflow condition is present if the amount of data scheduled for transmission is more than that accommodated by the reserved transmission resources for the scheduling period.

5. The method of claim 1, wherein dropping the data packet further comprises dropping from the selected at least one service bearer a packet with a highest sequence number.

6. The method of claim 1, wherein the network node and one or more additional network nodes are configured to select at least one identical service bearer with a same choice of the highest value or lowest value of the ratio and drop an identical data packet from the selected identical service bearer.

7. A method, comprising:
   a) receiving at a network node from a core network entity a plurality of data packets scheduled for transmission during a scheduling period and synchronization information for a plurality of service bearers;
   b) determining whether there is an overflow condition based on the received synchronization information and transmission resources reserved for the plurality of service bearers for the scheduling period in a single-frequency network;
   c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio;
   d) dropping a data packet from the selected at least one service bearer; and
   breaking a tie between two selected service bearers sequentially applying following criteria until the tie is broken: a largest packet loss rate, a lowest priority, and a lowest temporary mobile group identifier (TMGI).

8. An apparatus, comprising:
   at least one processor; and
   at least one memory including computer program code,
   the at least one memory and the computer program code configured to, with the at least one processor, cause the apparatus to perform at least the following:
   a) receiving from a core network entity a plurality of data packets scheduled for transmission during a scheduling period, and synchronization information for a plurality of service bearers;
   b) determining whether there is an overflow condition based on the received synchronization information and transmission resources reserved for the plurality of service bearers for the scheduling period in a single-frequency network;
   c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and d) dropping a data packet from the selected at least one service bearer, wherein the two quantities are an amount of data assigned to the service bearer, and an amount of data guaranteed for the service bearer by its guaranteed bit rate for the scheduling period respectively, and each of the plurality of service bearers is a broadcast service bearer, and wherein the bearer selection function involves computing for each of the broadcast service bearers a bearer selection value Pi, wherein $Pi=D_i \times \Pi_{j \neq i} GBR_j$, $D_i$ is an amount of data assigned to ith broadcast data stream for the scheduling period, and $\Pi_{j \neq i} GBR_j$ is a product of guaranteed bit rates of all the broadcast service bearers multiplexed on a multicast channel except for the ith guaranteed bit rate for the ith broadcast service bearer.

9. The apparatus of claim 8, wherein the at least one memory and the computer program code are configured to, with the at least one processor, cause the apparatus to further perform:

repeating the steps b) through d) until the overflow condition is corrected.

10. The apparatus of claim 8, wherein determining whether there is the overflow condition further comprise determining that the overflow condition is present if the received data packets scheduled for transmission are more than that accommodated by the reserved transmission resources for the scheduling period.

11. The apparatus of claim 8, wherein dropping the data packet further comprises dropping from the selected at least one service bearer a data packet with a highest sequence number.

12. The apparatus of claim 8, wherein the apparatus and one or more additional base stations are configured to select at least one identical service bearer with a same choice of the highest value or lowest value of the ratio and drop an identical data packet from the selected identical service bearer, based at least in part on the bearer selection function.

13. An apparatus, comprising:
at least one processor; and
at least one memory including computer program code,
the at least one memory and the computer program code configured to, with the at least one processor, cause the apparatus to perform at least the following:
a) receiving from a core network entity a plurality of data packets scheduled for transmission during a scheduling period, and synchronization information for a plurality of service bearers;
b) determining whether there is an overflow condition based on the received synchronization information and transmission resources reserved for the plurality of service bearers for the scheduling period in a single-frequency network;
c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio;

d) dropping a data packet from the selected at least one service bearer; and
breaking a tie between two selected service bearers sequentially using following criteria until the tie is broken: a largest packet loss rate, a lowest priority, and a lowest temporary mobile group identifier (TMGI).

14. A system, comprising
a plurality of base stations, each of the base stations comprising
at least one processor; and
at least one memory including computer program code,
the at least one memory and the computer program code configured to, with the at least one processor, cause the base station to perform at least the following:
a) receiving from a core network entity a plurality of data packets scheduled for transmission during a scheduling period, and synchronization information for a plurality of service bearers;
b) determining whether there is an overflow condition based on the received synchronization information and transmission resources reserved for the plurality of service bearers for the scheduling period in a single-frequency network;
c) upon determining that the overflow condition is present, selecting among the plurality of service bearers at least one service bearer based on a bearer selection function, wherein the bearer selection function results in selecting the service bearer with a highest value or a lowest value of a ratio of two quantities each with a specific value for each of the plurality of service bearers, and wherein the bearer selection function does not directly compute any ratio; and
d) dropping a data packet from the selected at least one service bearer, wherein the two quantities are an amount of data assigned to the service bearer, and an amount of data guaranteed for the service bearer by its guaranteed bit rate for the scheduling period respectively, and each of the plurality of service bearers is a broadcast service bearer, and wherein the bearer selection function involves computing for each of the broadcast service bearers a bearer selection value $Pi=D_i \times \Pi_{j \neq i} GBR_j$, $D_i$ is an amount of data assigned to ith broadcast data stream for the scheduling period, and $\Pi_{j \neq i} GBR_j$ is a product of guaranteed bit rates of all the broadcast service bearers multiplexed on a multicast channel except for the ith guaranteed bit rate for the ith broadcast service bearer.

15. The system of claim 14, wherein the at least one memory and the computer program code are configured to, with the at least one processor, cause the base station to further perform:

repeating the steps b) through d) until the overflow condition is corrected.

16. The system of claim 14, wherein the plurality of base stations are configured to select at least one identical service bearer and drop an identical data packet from the selected at least one identical service bearer, based at least in part on the bearer selection function.

17. The system of claim 14, wherein the plurality of base stations are configured to receive an identical reservation of the plurality of service bearers and the scheduling period.

* * * * *